United States Patent
Perrier et al.

(10) Patent No.: US 11,603,905 B2
(45) Date of Patent: Mar. 14, 2023

(54) CORD LOCK WITH ATTACHMENT

(71) Applicants: Ray Perrier, Tecumseh (CA); Tess Lachance, Tecumseh (CA)

(72) Inventors: Ray Perrier, Tecumseh (CA); Tess Lachance, Tecumseh (CA)

(*) Notice: Subject to any disclaimer, the term of this patent is extended or adjusted under 35 U.S.C. 154(b) by 0 days.

(21) Appl. No.: 17/305,970

(22) Filed: Jul. 19, 2021

(65) Prior Publication Data
US 2022/0018419 A1    Jan. 20, 2022

Related U.S. Application Data

(60) Provisional application No. 62/705,838, filed on Jul. 17, 2020.

(51) Int. Cl.
*F16G 11/10*     (2006.01)

(52) U.S. Cl.
CPC .................. *F16G 11/101* (2013.01)

(58) Field of Classification Search
CPC ............................ F16G 11/101; Y10T 24/3984
See application file for complete search history.

(56) References Cited

U.S. PATENT DOCUMENTS

| | | | | |
|---|---|---|---|---|
| 2,471,623 | A * | 5/1949 | Hubbell | A61M 39/28 604/185 |
| 7,152,285 | B2 * | 12/2006 | Liao | A43C 11/00 24/712.7 |
| 8,181,320 | B2 * | 5/2012 | Wolfberg | A43C 7/00 36/50.1 |
| 8,650,720 | B2 * | 2/2014 | Wicker | A47H 3/02 24/136 R |
| 10,512,304 | B2 * | 12/2019 | Nussbaum | A43C 7/08 |
| 2002/0083562 | A1 * | 7/2002 | Lerra | A44B 11/266 24/115 G |
| 2004/0221433 | A1 * | 11/2004 | Wolfberg | A43B 3/0078 24/712.5 |
| 2021/0298427 | A1 * | 9/2021 | Perrier | A43C 7/00 |

* cited by examiner

*Primary Examiner* — Robert Sandy
*Assistant Examiner* — Louis A Mercado
(74) *Attorney, Agent, or Firm* — Law Office of Scott C Harris, Inc

(57) ABSTRACT

A cord lock for cords with a snap part. The cord lock device has a movable top part that forms a button that is pressed to release tension on a cord. When the button is released, the cord is held. The button has a pressing surface which is pressed to bring cord passing surfaces on first and second parts into communication with one another, to release tension on the cord passing through the cord passing surfaces. The pressing surface has a socket for a snap on device, which can be a decorative or useful snap in device.

8 Claims, 4 Drawing Sheets

Decorative

Compass

GPS

Light

CORD LOCK WITH ATTACHMENT

This application claims priority from application No. 62/705,858, filed Jul. 17, 2020, the entire contents of which are herewith incorporated by reference.

BACKGROUND

Cord locks are used to hold cords into place after they have been tightened or loosened. The cords can be held to secure or attach to various items including shoes, jackets, pants, hats, cell phone cases, and anything else that has a cord.

A bungee cord, paracord, ribbon, lanyard, laces or other cords can be held with such a cord lock. These cords can be made of different types of materials.

The current method of personalizing these cord locks today is by choosing different (limited) colors, shapes and materials.

My provisional application No. 63/002,931, filed Mar. 31, 2020, describes a cord lock device which is secured into place.

SUMMARY

According to the present application, a cord lock fastener device is outfitted with a snap buttons to allow removable attachment of personalizing items on to the cord lock fastener device.

According to an embodiment, the front facing surface portion of the cord lock fastenser includes a snap button, which allows items to be attached to the cord lock fastener, to change the look of the cord lock fastener.

In an embodiment, the parts that connect to the snap button are located inside the otherwise hollow portion of the housing of the cord lock fastener device.

BRIEF DESCRIPTION OF THE DRAWINGS

These and other aspects will now be described in detail with reference to the accompanying drawings which show aspects of the invention.

DETAILED DESCRIPTION

The present application describes a snap system that attaches to a cord lock. One embodiment uses the cord lock device described in my copending application Ser. No. 17/301,267, filed Mar. 30, 2021, the entire contents of which are herewith incorporated by reference, for securing footwear and laces in a way that is wholly different from the prior art. That system uses a shoelace, a cord fastener on the shoelace, and a locking mechanism. However, the current system can be located on any kind of cord lock device.

Figure 1:
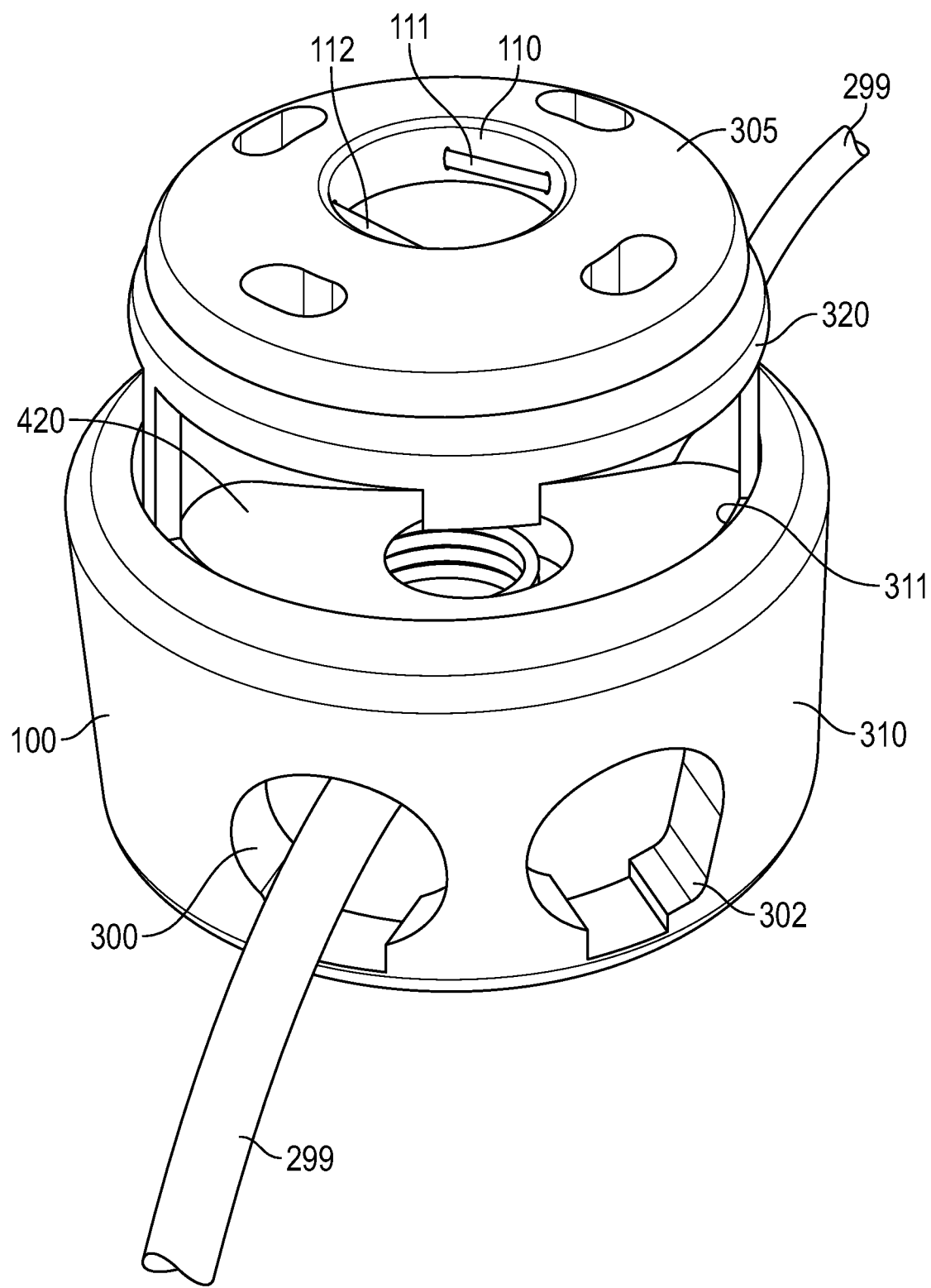
FIG. 1 shows a front view of the cord lock device.

FIG. 1 illustrates the special cord lock device 100 according to an embodiment. The cord lock device 100 has two parts which are movable relative to one another and are held in position by a spring system. A movable top housing part 320 fits inside of and presses down relative to a bottom housing part 310. The movable top housing part 320 forms a button that is pressed to relieve tension on the cord, as described herein.

There are cord passing surfaces 300, 302 for the cord(s) formed by openings in the bottom housing part 310 and also one or more openings forming cord passing surface 420 in the top housing part 320. A spring 405 normally biases the top part upward relative to the bottom part.

When the top housing part 320 is pressed down relative to the bottom housing part 310 against the spring force, this pushes the cord passing surface 420 in the top part down relative to the bottom part, until the cord passing surface 420 align with the cord passing surface 300 in the bottom part. When these cord passing surface 300, 420 align, tension is released on a cord 299 passing through the cord lock device 100. When the top part is released, the internal spring pushes up on the top part, and causes tension to be held on the cords passing through the cord lock device.

The top housing part 320 is smaller than, and fits within the inner surfaces 311 of the bottom housing part 310 of the cord lock so that the top movable portion can move up and down inside that inner surfaces 311 of the bottom housing part 310.

The bottom housing part 310 includes cord passing surfaces 300, 302. The top portion also includes cord passing surfaces such as 420. When the top housing part 320 is pressed down, the cord passing surface 420 aligns with the cord passing surface 300, and similarly, the cord passing surfaces 302 and also align. When aligned, there is no tension or interference with the cord which can hence pass freely through the cord passing surface 300, 420.

When the top portion is released, spring force pushes up the top housing part 320, forming tension on the cord 299 between the cord passing surface 300 in the bottom housing part 310 and the cord passing surface 420 in the top housing part 320 and thus holding the cord with that tension.

An embodiment shown in FIG. 1 has two different cord passing surfaces 300/302, aligning with 420. However, in other embodiments, the cord passing portion can be for a single cord, a double cord as shown, a triple cord, or any other number of cords.

Flat upper surface 305 forms the topmost surface of the movable top housing 320 of the cord lock device. A snap button socket 110 forms cylindrical inside surfaces which receives a standard male portion of a snap on button item. The opening to the snap button socket 110 is adjacent to the flat surface 305 which is a substantially flat surface. Inside side surfaces of the snap button socket include, as conventional, spring portions 111, 112 which allow a ball shaped part of the snap on button item to pass over the spring portions 111 112, and be held in place underneath those surfaces. The attachment and holding of those surfaces is shown in detail in FIG. 3.

Figure 3:
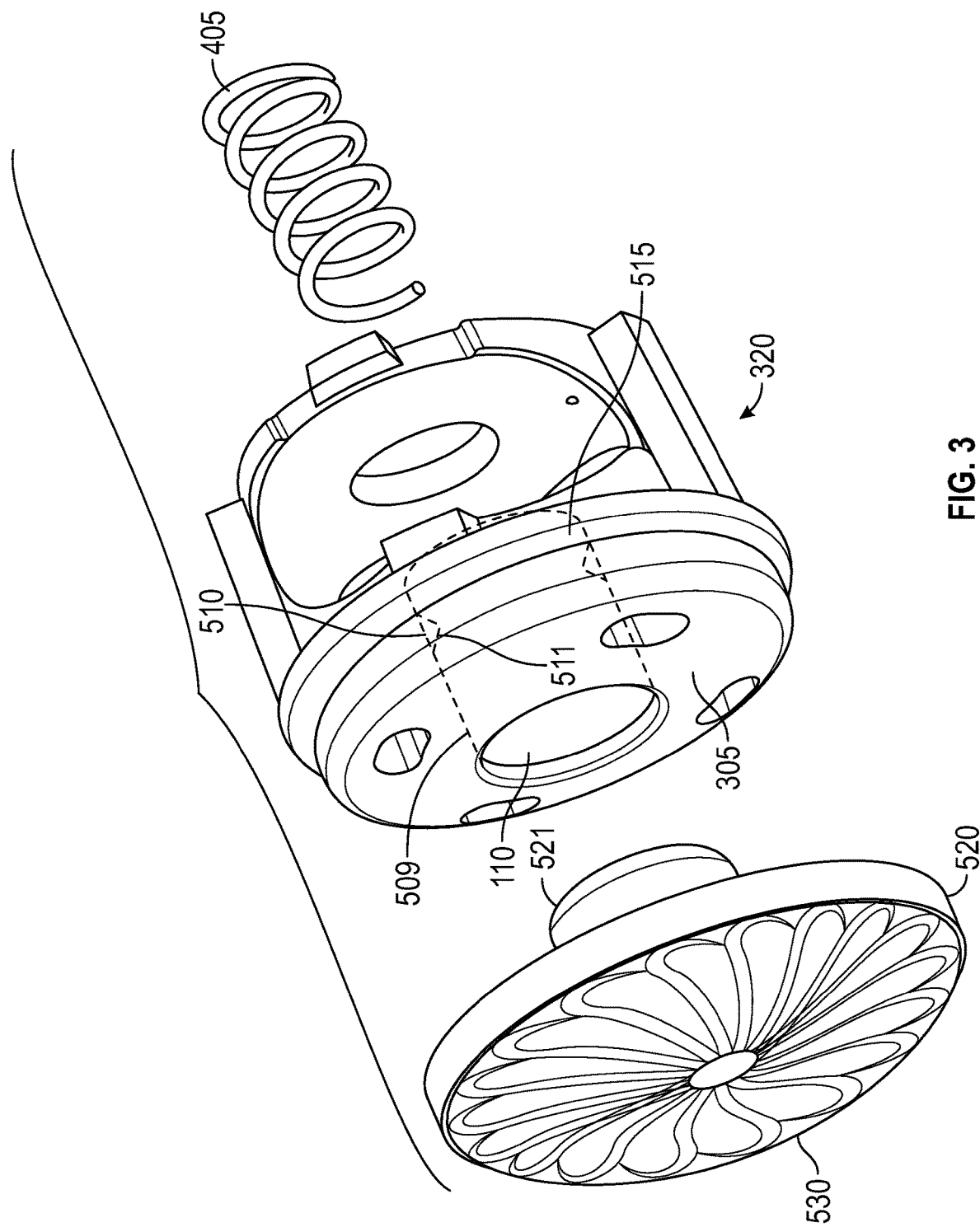
FIG. 3 shows a cutaway view, showing an inside of the button portion of the cord lock device.

FIG. 3 illustrates a cutaway section of the top housing part 320. Note that the top portion has a flat upper surface 305, which is the surface against which a user's finger is normally pressed to release the pressure on the cord lock. In this embodiment, the flat upper surface 305 is formed with an opening formed by the snap button socket 110. The opening leads to a snap button female socket divot 510 which is recessed inside the housing of the bottom housing part 310. The divot 510 includes as shown, a section where the opening becomes smaller, changing from the first diameter 509 of the inside of the socket to a second smaller diameter 511 on the inside of the socket. This change in diameter is affected by the spring portions 111 112 shown in FIG. 1, and serves to hold, by spring action, the head portion 521 of the snap into the round socket area 515 once the head portion 521 has been inserted and used to press open the spring portions 111, 112. Also, the head portion 521 of the snap can rotate once inserted in the round socket area 515, since it is being held in place by these spring portions 111, 112. The male portion 520 of the snap includes the head portion 521 that mates with the round socket area 515, and also a decorative portion 530 which can be different kinds of decorative portions as described herein. By locating the round socket area 515 of the snap socket inside the housing, this allows the snap button to be attached to the flat upper surface 305, without taking up any extra space. The snap socket 510 needs to be short enough that it does not interfere with the action of the spring 405, when the button is pressed or in any desired position.

In other embodiments, the snap button socket 110 can also be countersunk inside the top housing part 320 of the cord lock.

Likewise, the snap button socket 110 can also be on the bottom housing part 310 or on both 320 and 310 portions of the cord lock.

An embodiment describes the snap socket, that is the female component of the snap, being located on the flat upper surface 305. However, alternatively, the male portion of the snap can be located on the flat upper surface 305, and the decorative part of the snap can be connected to the female portion.

Figure 2:
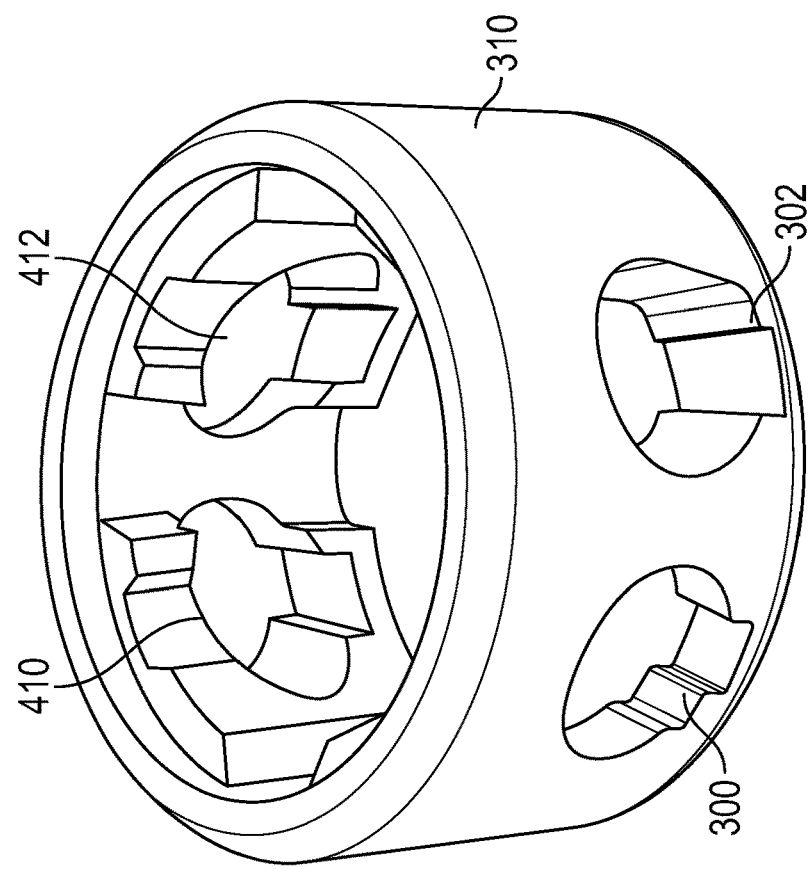
FIG. 2 shows a disassembled view of the cord lock device, showing the inner housing and outer housing which are movable relative to one another.
Figure 2:
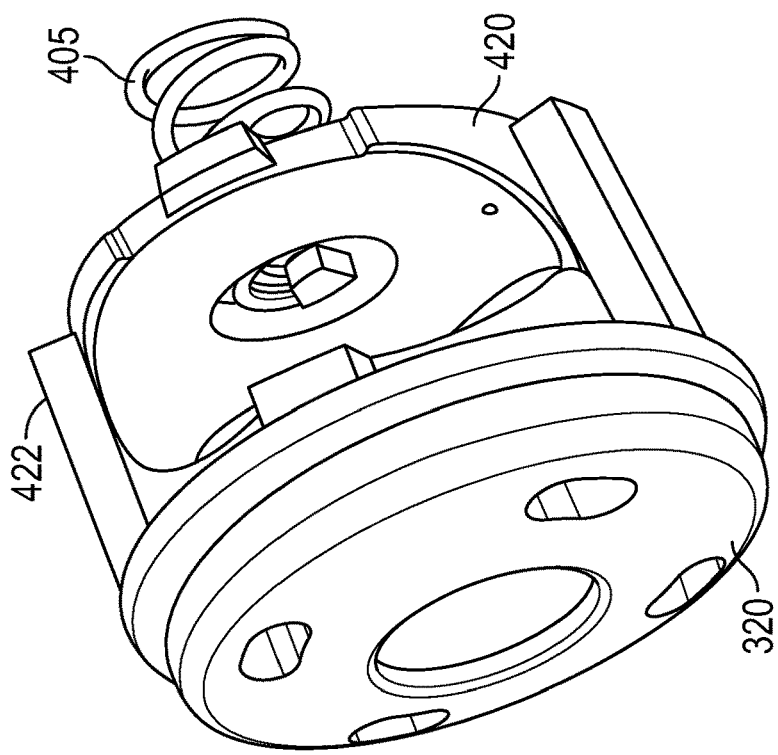

FIG. 2 illustrates the disassembled version of the snap cord lock. The bottom housing part 310 of the cord lock is shown with the cord passing surfaces 300 302 in the front, and also rear cord passing surfaces 410, 412. Similarly, the top housing part 320 has the cord passing surface 420 passing through from the front to the rear 422. The cord passing surface can be large enough to hold multiple cords.

Normally, when the top housing part 320 is spring biased up by the force of the spring 405, the spring bias tensions the cord(s) and prevents them from moving. In operation, when the top housing part 320 is depressed against the force of the spring 405, the front cord surfaces 300, 302 aligns with rear cord passing surfaces 410, 412 via the cord passing surface 420, opening a slot for the cord. The cord is placed therebetween, and then the pressure on the top portion is removed. This causes the top portion to bias upwards under the force of the spring 405, and thus hold the cord into place.

The cord lock as described has surfaces for holding two different cords, but it should be understood that this cord lock can also hold a single cord.

Figure 4A:
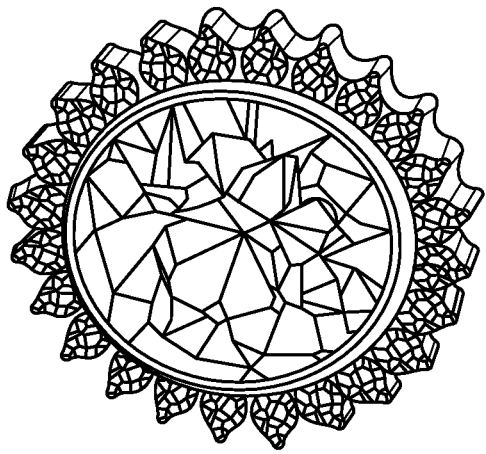
FIG. 4A shows a decorative button piece.
Figure 4B:
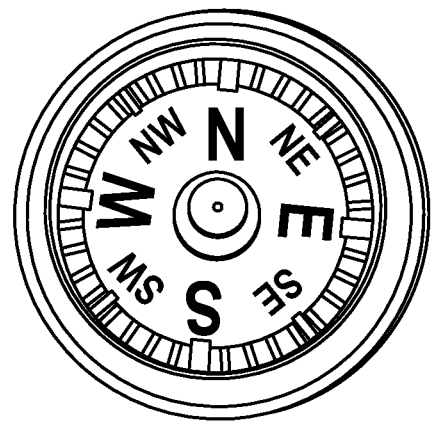
FIG. 4B shows a compass snapon piece.
Figure 4C:
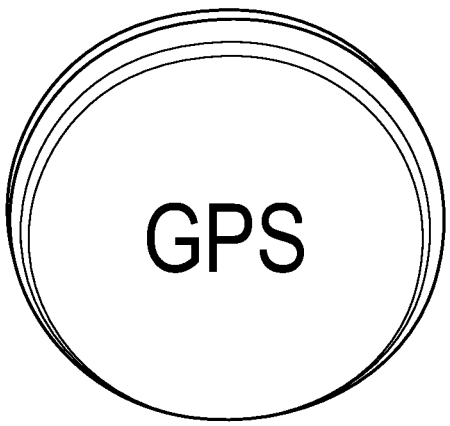
FIG. 4C shows a GPS snapon piece.
Figure 4D:
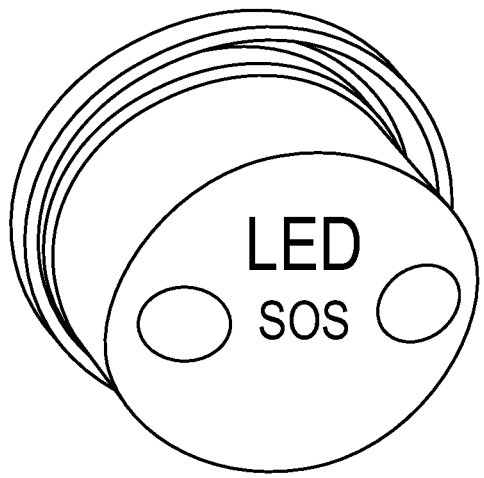
FIG. 4D shows a light snapon piece.

Decorative portion 530 can be any kind of decorative item, including a decorative button as in FIG. 4A, a compass as in FIG. 4B, a GPS for kids as in FIG. 4C, a jewel or decorative item, or a badge or logo or flashing light as in FIG. 4D, an electronic device such as a GPS as in FIG. 4C, or other items.

This fastening system can be implemented in paracord projects and to close clothing, or to close containers, such as a backpack, duffle bag or any other item that can be opened and closed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A cord lock device, comprising:
a cord lock device, having a first housing part forming an outer housing and a second housing part which moves relative to and inside of an inner surface of the first housing part, and a spring device that maintains pressure between the first and second housing parts,
the first housing part and the second housing part having cord passing surfaces allowing at least one cord to pass through the cord passing surfaces,
and the second housing part having a pressing surface which is pressed to bring the cord passing surfaces on the first and second housing parts into communication with one another, to release tension on the cord passing through the cord passing surfaces,
wherein the pressing surface includes a socket for a snap-on device,
the socket including a cylindrical inner surface having first and second spring elements inside the socket, where the cylindrical inner surface has a first constant diameter portion, and a second reduced diameter portion at a location of the spring elements where the spring elements extend into the cylindrical inner surface,
and further comprising a snap-on device with a snap head that pushes open the first and second spring elements to fit into a snap shaped socket area held by the first and second spring elements by spring action of the first and second spring elements.

2. The device as in claim 1, wherein the socket is inside of the second housing part, the socket having an opening that opens into the pressing surface, to hold the snap-on device inside of the second housing part.

3. The device as in claim 1, wherein the snap-on device, has a decorative part thereon, the snap-on device attached into the socket inside of the second housing part and held by the first and second spring elements.

4. The device as in claim 3, wherein the decorative part includes a compass thereon.

5. The device as in claim 3, wherein the decorative part includes a GPS device thereon.

6. The device as in claim 3, wherein the decorative part includes a light device thereon.

7. The device as in claim 3, wherein the snap-on device is rotatable once attached into the socket and held by the first and second spring elements.

8. The device as in claim 1, wherein the socket for the snap-on device extends into the pressing surface and below the pressing surface.

* * * * *